(12) United States Patent
Nakamura et al.

(10) Patent No.: US 11,995,070 B2
(45) Date of Patent: May 28, 2024

(54) QUERY EXPRESSION ERROR DETECTION AND CORRECTION

(71) Applicant: INTERNATIONAL BUSINESS MACHINES CORPORATION, Armonk, NY (US)

(72) Inventors: Hiroaki Nakamura, Yokohama (JP); Toshiaki Yasue, Sagamihara (JP); Kohichi Ono, Setagaya-ku (JP); Nobuhiro Hosokawa, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 38 days.

(21) Appl. No.: 17/655,011

(22) Filed: Mar. 16, 2022

(65) Prior Publication Data

US 2023/0297564 A1   Sep. 21, 2023

(51) Int. Cl.
*G06F 16/242* (2019.01)
*G06F 16/2455* (2019.01)
*G06F 16/28* (2019.01)

(52) U.S. Cl.
CPC ...... *G06F 16/242* (2019.01); *G06F 16/24565* (2019.01); *G06F 16/288* (2019.01)

(58) Field of Classification Search
None
See application file for complete search history.

(56) References Cited

U.S. PATENT DOCUMENTS

2008/0270343 A1* 10/2008 Brodsky ................... G06F 8/33
2008/0270989 A1   10/2008 Ahadian
2011/0035370 A1*  2/2011 Ortega ............... G06F 16/3322
                                                     707/E17.108
2018/0060302 A1*  3/2018 Liang ................... G06F 16/35
2022/0318244 A1* 10/2022 Pihur ................. G06F 16/2462
2023/0237053 A1*  7/2023 Dangoor ......... G06F 16/24539
                                                     707/767

FOREIGN PATENT DOCUMENTS

| CN | 108052658 A | 5/2018 |
| CN | 105550171 B | 10/2018 |
| CN | 107066533 B | 10/2020 |

OTHER PUBLICATIONS

Yue et al., "Calcuation method and device for similarity of query word as well as query word searching method and device", 2015 (Year: 2015).*

(Continued)

*Primary Examiner* — Dawaune A Conyers
(74) *Attorney, Agent, or Firm* — Eric W. Chesley (57) ABSTRACT

A method, system, and computer program product for error detection and correction of query expressions are provided. The method extracts a first set of queries from a set of programs prior to query editing. A first word set is generated from the first set of queries. A second set of queries are extracted from the set of programs after query editing. A second word set is generated from the second set of queries. The method determines a set of differences for word pairs within the first word set and the second word set. A third word set is generated from one or more edited queries based on the set of differences. The method generates an error report for the third word set based on the third word set and the set of differences.

20 Claims, 6 Drawing Sheets

(56) References Cited

OTHER PUBLICATIONS

Xiaoni et al., "Text matching method and device and computer equipment", 2021 (Year: 2021).*

Alwabel, A., "CoEdit: A novel error correction mechanism in compilers using spelling correction algorithms," Journal of King Saud University—Computer and Information Sciences, 2021, 11 pages.

Mell et al., "The NIST Definition of Cloud Computing," Recommendations of the National Institute of Standards and Technology, U.S. Department of Commerce, Special Publication 800-145, Sep. 2011, 7 pgs.

Ramzan et al., "Intelligent Data Engineering for Migration to NoSQL Based Secure Environments," IEEEAccess Special Section on Advanced Software and Data Engineering for Secure Societies, Jun. 7, 2019, 16 pages, vol. 7.

* cited by examiner

QUERY EXPRESSION ERROR DETECTION AND CORRECTION

BACKGROUND

Applications and program use query expressions to describe data to be retrieved from a data source. Large applications or programs often contain many different queries or different potential queries. Queries are often embedded in applications or programs to facilitate understanding of functional relationships between a given query and an associated program segment. Embedded queries are often spread throughout coding for applications or programs. Some query relationships are derived using database schema information. Such relationship derivation can indicate relationships between tables and columns and foreign key constraints. Schema-less databases present difficulties for relationship derivation.

SUMMARY

According to an embodiment described herein, a computer-implemented method for error detection and correction of query expressions is provided. The method extracts a first set of queries from a set of programs prior to query editing. A first word set is generated from the first set of queries. A second set of queries are extracted from the set of programs after query editing. A second word set is generated from the second set of queries. The method determines a set of differences for word pairs within the first word set and the second word set. A third word set is generated from one or more edited queries based on the set of differences. The method generates an error report for the third word set based on the third word set and the set of differences.

According to an embodiment described herein, a system for error detection and correction of query expressions is provided. The system includes one or more processors and a computer-readable storage medium, coupled to the one or more processors, storing program instructions that, when executed by the one or more processors, cause the one or more processors to perform operations. The operations extract a first set of queries from a set of programs prior to query editing. A first word set is generated from the first set of queries. A second set of queries are extracted from the set of programs after query editing. A second word set is generated from the second set of queries. The operations determine a set of differences for word pairs within the first word set and the second word set. A third word set is generated from one or more edited queries based on the set of differences. The operations generate an error report for the third word set based on the third word set and the set of differences.

According to an embodiment described herein, a computer program product for error detection and correction of query expressions is provided. The computer program product includes a computer-readable storage medium having program instructions embodied therewith, the program instructions being executable by one or more processors to cause the one or more processors to extract a first set of queries from a set of programs prior to query editing. A first word set is generated from the first set of queries. A second set of queries are extracted from the set of programs after query editing. A second word set is generated from the second set of queries. The computer program product determines a set of differences for word pairs within the first word set and the second word set. A third word set is generated from one or more edited queries based on the set of differences. The computer program product generates an error report for the third word set based on the third word set and the set of differences.

DETAILED DESCRIPTION

The present disclosure relates generally to methods for error detection and correction of query expressions. More particularly, but not exclusively, embodiments of the present disclosure relate to a computer-implemented method for using word pair combinations and combination strengths for word pairs before and after query editing for error detection and correction of query expressions. The present disclosure relates further to a related system for error detection and correction of query expressions, and a computer program product for operating such a system.

Applications and program use query expressions to describe data to be retrieved from a data source. Large applications or programs often contain many different queries or different potential queries. Queries existing within applications or programs are periodically updated or new queries may be added to existing applications or programs. Errors in query expressions often occur during the updating or adding process. Some errors in queries are caused by incorrect combinations of query expressions or query elements. Such combination errors are often difficult to detect using current methods and systems for query error detection.

Queries can be embedded in applications or programs to facilitate understanding of functional relationships between a given query and an associated program segment. Embedded queries are often spread throughout coding for applications or programs. The distribution of queries throughout program or application code can present difficulties for error detection of those queries. Some query relationships are derived using database schema information. Such relationship derivation can indicate relationships between tables and columns and foreign key constraints. However, many types of combination errors cannot be detected using relationship derivation by database schema. For example, table mismatch combination errors in join clauses are not detectable using current relationship derivation techniques. Schema-less databases present difficulties for relationship derivation. The relationship derivation process using database schema is not usable in schema-less databases. Current error detection methods, techniques, and systems often fail to detect certain types of query errors and fail to provide suitable corrections for query expressions. As such, error detection and correction techniques which can detect disparate query errors and be used regardless of database implementation (e.g., schema or schema-less) is needed.

Embodiments of the present disclosure enables error detection and correction of query expressions. The present disclosure enables a computer-implemented method for using word pair combinations and combination strengths for word pairs before and after query editing for error detection and correction of query expressions. The present disclosure enables or supports error detection and correction of query expressions in various program and application types. Embodiments of the present disclosure enable error detection and correction of query expression regardless of database schema or schema-less databases. Some embodiments of the present disclosure enable evaluation of word pair combination strengths. The present disclosure enables comparison of combination strengths of word pairs before and after query editing operations are performed on an application or program. The present disclosure enables notification or reporting of query errors and provides error correction suggestions. Some embodiments of the present disclosure enable notification of query words with combination strengths indicating a query error and query words with combination strengths indicating error correction candidacy.

Some embodiments of the concepts described herein may take the form of a system or a computer program product. For example, a computer program product may store program instructions that, when executed by one or more processors of a computing system, cause the computing system to perform operations described above with respect to the computer-implemented method. By way of further example, the system may comprise components, such as processors and computer-readable storage media. The computer-readable storage media may interact with other components of the system to cause the system to execute program instructions comprising operations of the computer-implemented method, described herein. For the purpose of this description, a computer-usable or computer-readable medium may be any apparatus that may contain means for storing, communicating, propagating, or transporting the program for use, by, or in connection with, the instruction execution system, apparatus, or device.

Figure 1:
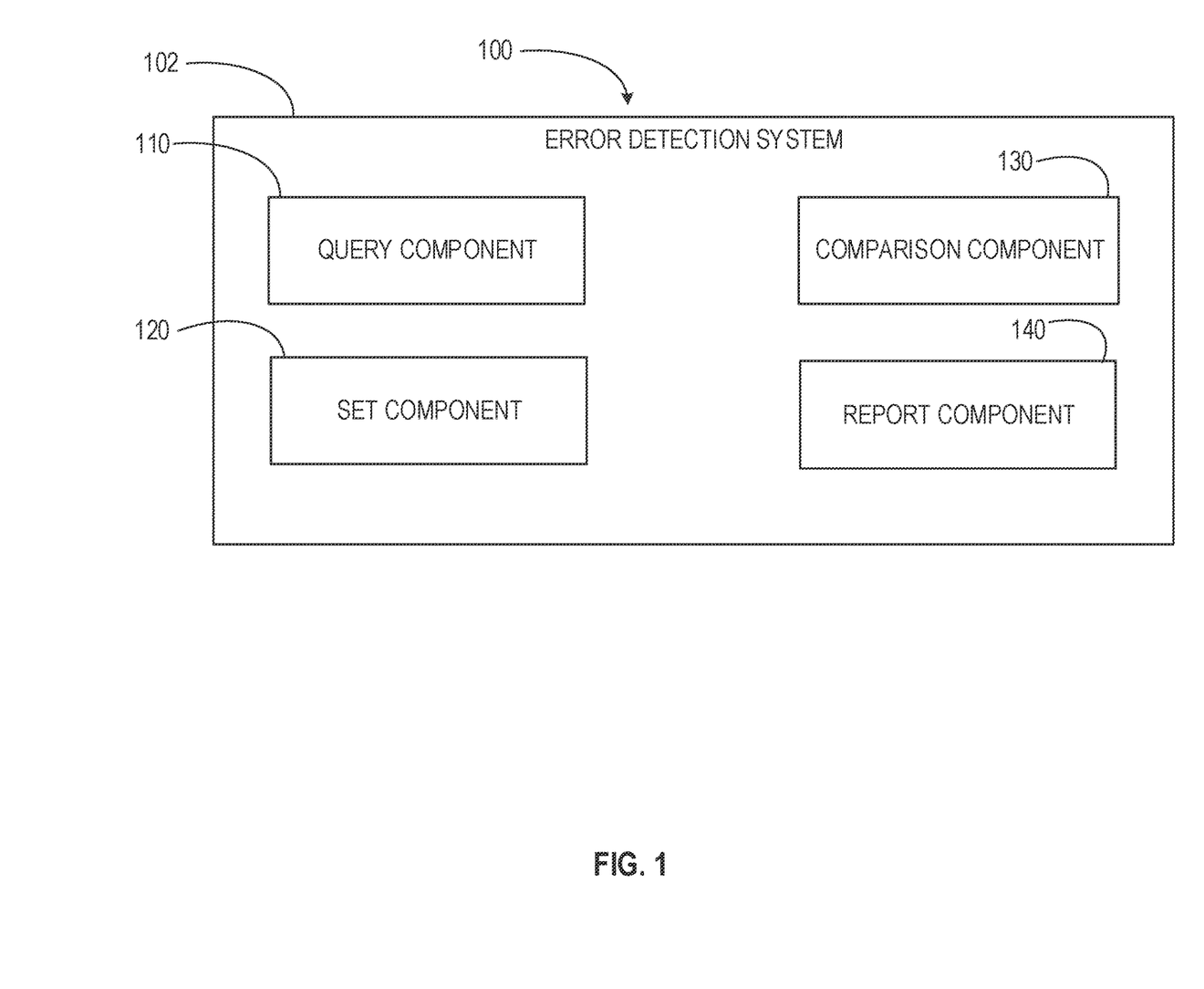
FIG. 1 depicts a block diagram of a computing environment for implementing concepts and computer-based methods, according to at least one embodiment.

Referring now to FIG. 1, a block diagram of an example computing environment 100 is shown. The present disclosure may be implemented within the example computing environment 100. In some embodiments, the computing environment 100 may be included within or embodied by a computer system, described below. The computing environment 100 may include an error detection system 102. The error detection system 102 may comprise a query component 110, a set component 120, a comparison component 130, and a report component 140. The query component 110 identifies and extracts sets of queries from a set of programs. The set component 120 generates word sets from extracted sets of queries. The comparison component 130 determines similarities and differences among word sets generated from extracted sets of queries. The report component 140 identifies words representing query errors, words representing query correction candidates, and generates error reports identifying one or more of the errors and correction candidates. Although described with distinct components, it should be understood that, in at least some embodiments, components may be combined or divided, and/or additional components may be added without departing from the scope of the present disclosure.

Figure 2:
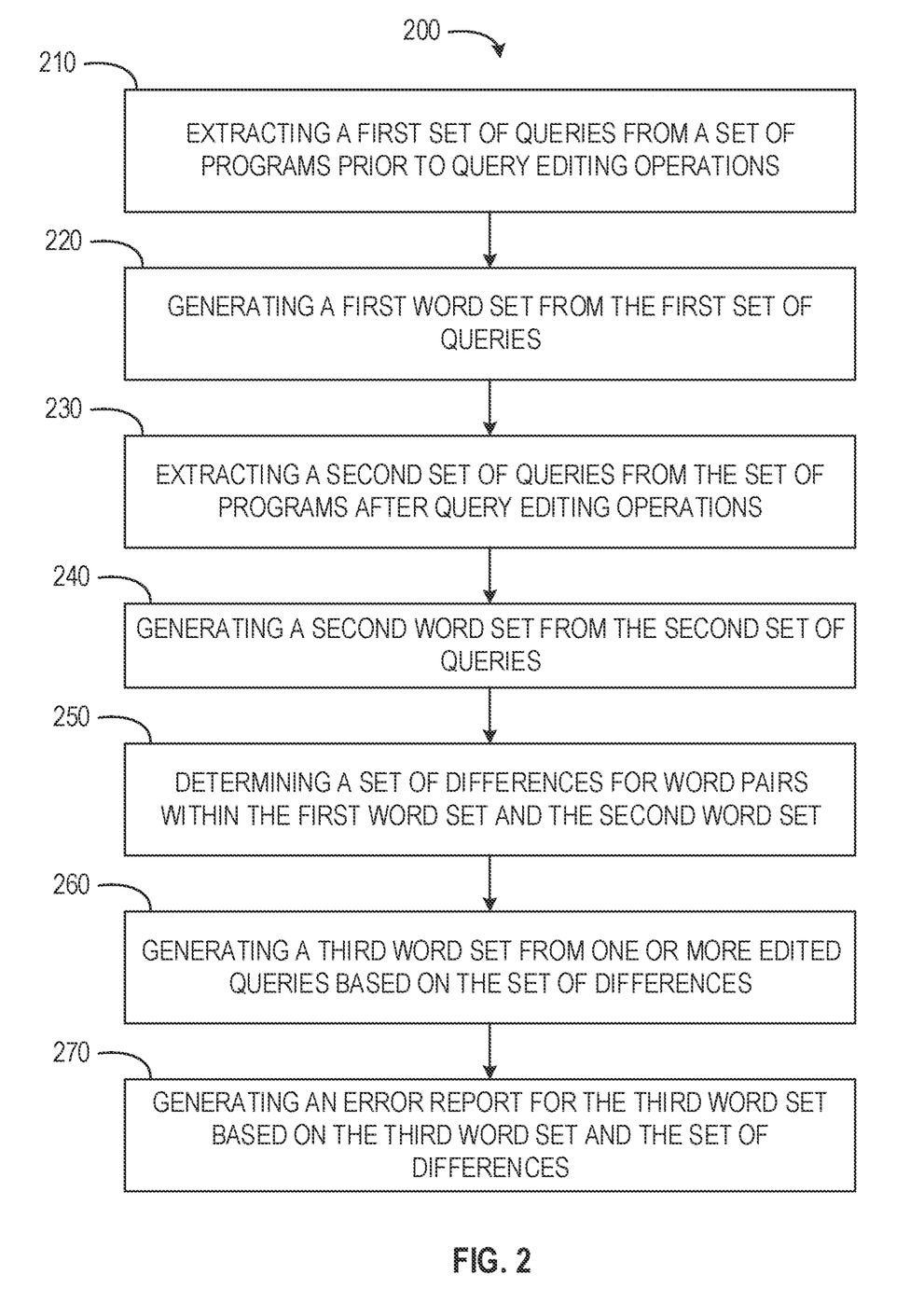
FIG. 2 depicts a flow diagram of a computer-implemented method for error detection and correction of query expressions, according to at least one embodiment.

Referring now to FIG. 2, a flow diagram of a computer-implemented method 200 is shown. The computer-implemented method 200 is a method for error detection and correction of query expressions. In some embodiments, the computer-implemented method 200 may be performed by one or more components of the computing environment 100, as described in more detail below.

At operation 210, the query component 110 extracts a first set of queries from a set of programs. The first set of queries may be extracted from the set of programs prior to query editing operations. The query editing operations may include operations to edit one or more queries within the set of programs or operations to edit code within the set of programs which may cause changes to at least one query within the set of programs. In some instances, the query editing operations are a set of operations to edit a single query within at least one program, such as query $q_e$. In some embodiments, the query component 110 extracts all queries from a set of programs. The set of programs may be all or a portion of programs within a folder, database, server, or cloud resource. The query component 110 may extract the queries based on any suitable delineation of queries within code forming the set of programs.

Query expressions used for a program or application may share word combinations. For example, table names may share words with table column names. Names of tables that are operands may share words with join operations. Names of variables may be passed to and from programs. Constant values in string literals and numbers may be used in conditional expressions. The query component 110 may extract the first set of queries leveraging shared word schemas, shared word instances, known query formats, combinations thereof, and any other suitable or relevant indications of queries.

The query component 110 may extract the first set of queries from the set of programs prior to query editing operations by accessing a pre-edit copy of the set of programs. The query component 110 may extract the first set of queries prior to query editing operations by being triggered upon initiation of query editing operations. In such instances, once a user initiates query editing operations on at least a portion of programs within the set of programs, the query component 110 may access the set of programs and extract the first set of queries from at least the portion of programs subject to the query editing operations.

At operation 220, the set component 120 generates a first word set from the first set of queries. The first word set may be generated by extracting words from the first set of queries. In some embodiments, the first word set is generated by extracting strings, numbers, or combinations thereof from each query of the first set of queries. The first word set may be represented as $W_i$.

At operation 230, the query component 110 extracts a second set of queries from the set of programs. The second set of queries may be extracted from the set of programs after query editing operations. The query component 110 may extract the second set of queries from the set of programs in a manner similar to or the same as described above with respect to operation 210. The query component 110 may extract the second set of queries after query editing operations by being triggered upon completion of the query editing operations. For example, upon completion, compiling, rendering, or otherwise finalizing query editing operations, the query component 110 may be automatically triggered by a component enabling or finalizing the query editing operations.

At operation 240, the set component 120 generates a second word set from the second set of queries. The set component 120 may generate the second word set from the second set of queries by extracting words from the second set of queries. The second word set may be generated by extracting strings, numbers, or combinations thereof from each query of the second set of queries. The second word set may be represented as $W'_i$.

At operation 250, the comparison component 130 determines a set of differences for word pairs within the first word set and the second word set. The comparison component 130 may compare strengths of all word pairs in query expressions before and after editing. In some embodiments, the comparison component 130 determines the set of differences by determining one or more similarities for each word pair in the first word set and each word pair in the second word set. In some embodiments, the similarities may be represented by similarity coefficients generated for word pairs. The similarity coefficients may be calculated as Jaccard index values. The comparison component 130 may then generate a set of difference scores for word pairs within the first word set and the second word set. Embodiments for determining the set of differences are further described with respect to operations 320 and 330.

Although described in some embodiments as being calculated as Jaccard index values, it should be understood that the similarity coefficients may be calculated in any suitable and relevant manner. For example, similarity coefficients may be calculated as Dice index or Simpson index values. Further, although some embodiments describe the comparison component 130 as determining differences between similarity coefficients before and after editing, the differences may be detected in any suitable and relevant manner. For example, the comparison component 130 may determine differences as a ratio of similarity coefficients.

At operation 260, the set component 120 generates a third word set. The third word set may be generated from one or more edited queries. The third word set may be generated from the one or more edited queries based on the set of differences determined by the comparison component 130.

In some embodiments, the third word set is generated from the one or more edited queries by generating a word score. The set component 120 may generate a word score for each word in the third word set. The word score may be representative of differences for word pairs of the word in the third word set and other words in the third word set. The word score may also be representative of differences for word pairs between words in the third word set and words in other word sets (e.g., the first word set or the second word set).

In some embodiments, the word score, $w_j$, may be generated for each word, $W'_e$, in the one or more edited queries. The generation of word scores may be represented as $w_j \in W'_e$. In some embodiments, the word score is calculated as $score(w_j)=avg(\{r(w_j, w_k)|w_k \in W'_e \wedge w_k \neq w_j\})$. In such instances $r(w_j, w_k)$ may be understood as difference scores for word pairs from the first word set and the second word set.

At operation 270, the report component 140 generates the error report for the third word set. The error report may be generated based on the third word set and the set of differences. In some embodiments, the report component 140 notifies a user that words whose combination strength increased most are errors. The report component 140 may notify the user that words whose combination strength decreased most are correction candidates.

In some embodiments, the report component 140 generates the error report by identifying a first word in the third word set with a highest word score. The first word may be identified as an error or a potential error. In some embodiments, the report component 140 identifies the first word with the highest score using a function such as Output $argmax_{w \in W'_e} score(w)$. The word with the highest word score or a set of words having a set of highest word scores are identified as errors or potential errors for the error report.

In some embodiments, the report component 140 generates the error report for the third word set by identifying a second word in the third word set with a lowest word score. The second word may be identified as an error correction or an error correction candidate. In some embodiments, the report component 140 identified the second word with the lowest score using a function such as $argmin_{w \in W'_e} score(w)$. The word with the lowest score or a set of words having a set of lowest scores may be identified as error correction candidates or error correction words for the error report.

For example, the error detection system 102 may take as input a set of queries before editing and a set of queries after editing. In the example, the set of queries after editing may have a query added which contain an error. A representation of the error containing query may be as follows: "match (app:Application:ORG_ID {name: "APP_NAME" })-[: HAS]→(tr:Transaction)-[:CALLS]→(p1:Program), (app)-[: HAS]→(p2:Program)-[r]→(res:File), path=shortestPath ((p1)-[:AFFINITY*0 . . . 10]→(p2)) where all(x IN nodes (path) WHERE exists((app)-[:HAS]→(x))) return distinct tr.name as R0, p1.name as R1, res.name as R2, r.Action as R3, extract(x IN nodes(path)|x.name) as R4;". The error detection system 102 may process the set of queries before and after editing to identify the error including query. The report component 140 of the error detection system 102 may output the error word, "Action," within the offending query in the error report. The report component 140 may also output a correction candidate, "File_Action," as a proposed correction for the error contained in the offending query.

Figure 3:
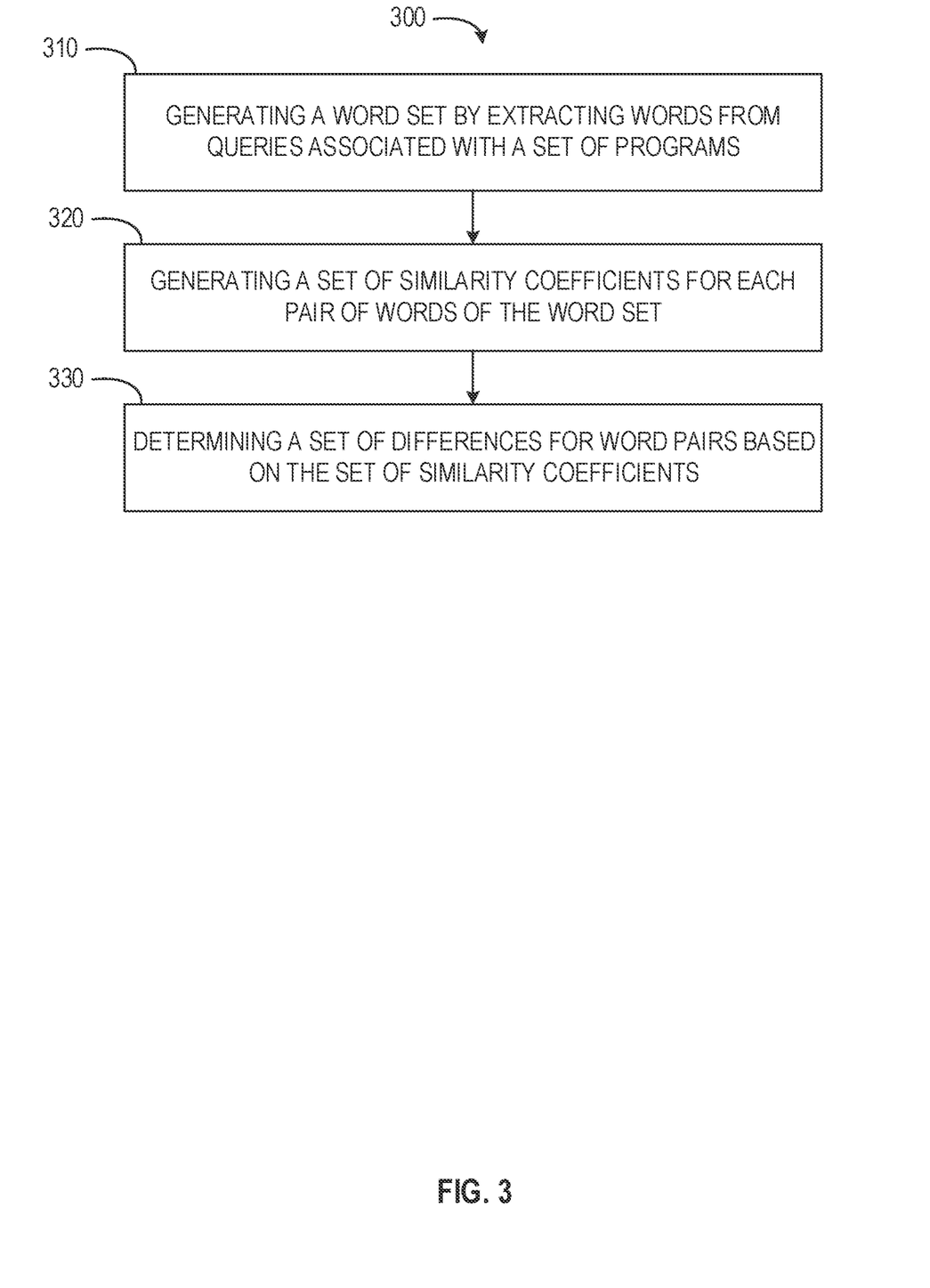
FIG. 3 depicts a flow diagram of a computer-implemented method for error detection and correction of query expressions, according to at least one embodiment.

FIG. 3 shows a flow diagram of an embodiment of a computer-implemented method 300 for error detection and correction of query expressions. The method 300 may be performed by or within the computing environment 100. In some embodiments, the method 300 comprises or incorporates one or more operations of the method 200. In some instances, operations of the method 300 may be incorporated as part of or sub-operations of the method 200.

In operation 310, the set component 120 generates a word set by extracting words from queries associated with a set of programs. In some embodiments, the set component 120 extracts words from each query of a set of queries within a set of programs. The extracted words may be formed into a word set. The word set may be a first word set formed prior to query editing operations are performed on the set of programs. In some instances, the word set is a second word set formed after query editing operations are performed on the set of programs. The word sets may be generated in a manner similar to or the same as described above with respect to operations 220 and 240.

In operation 320, the comparison component 130 generates a set of similarity coefficients for the word set. In some embodiments, the comparison component 130 generates a similarity coefficient for each word pair of the word set. For example, the comparison component 130 may generate a first similarity coefficient for each word pair of a first word set extracted and generated from a set of programs prior to query editing operations being performed. The comparison component 130 may generate a second similarity coefficient for each word pair of a second word set extracted and generated from a set of programs after query editing operations have been performed.

The comparison component 130 may generate the set of similarity coefficients for a word pair $w_j$, $w_k \in \cup W_i$ by computing a Jaccard index. In such instances, the similarity coefficient for each word pair may be generated as $c(w_j, w_k)$=(number of queries that contain $w_j$ and $w_k$)/(number of queries that contain $w_j$ or $w_k$). Where a first word set and a second word set have been generated based on queries prior to and after query editing operations, the comparison component 130 may generate sets of similarity coefficients for word pairs in each of the first word set and the second word set. For example, the similarity coefficients for the first word set may be generated as referenced above. The set of similarity coefficients for word pairs, $w_j$, $w_k \in \cup W'_i$, of the second word set may be generated as $c'(w_j, w_k)$=(number of queries that contain $w_j$ and $w_k$)/(number of queries that contain $w_j$ or $w_k$).

In operation 330, the comparison component 130 determines the set of differences for word pairs based on similarity coefficients. In some embodiments, the comparison component 130 determines the set of differences for each word pair previously extracted. In some instances, for each word pair of a first word pair and a second word pair, the comparison component 130 generates a difference for the word pair between a first similarity coefficient and a second similarity coefficient.

In some embodiments, the comparison component 130 determines the set of differences for word pairs by computing a difference value for word pairs between first word pairs and second word pairs. The difference value may be calculated based on similarity coefficients generated for each word pair. In some instances, the difference value for each word pair, $w_j$, $w_k \in \cup W'_i$, may be computed as $r(w_j, w_k)=c'(w_j, w_k)-c(w_j, w_k)$. In some instances, if $c(w_j, w_k)$ is undefined, $c(w_j, w_k)$ set as 0.

Figure 4:
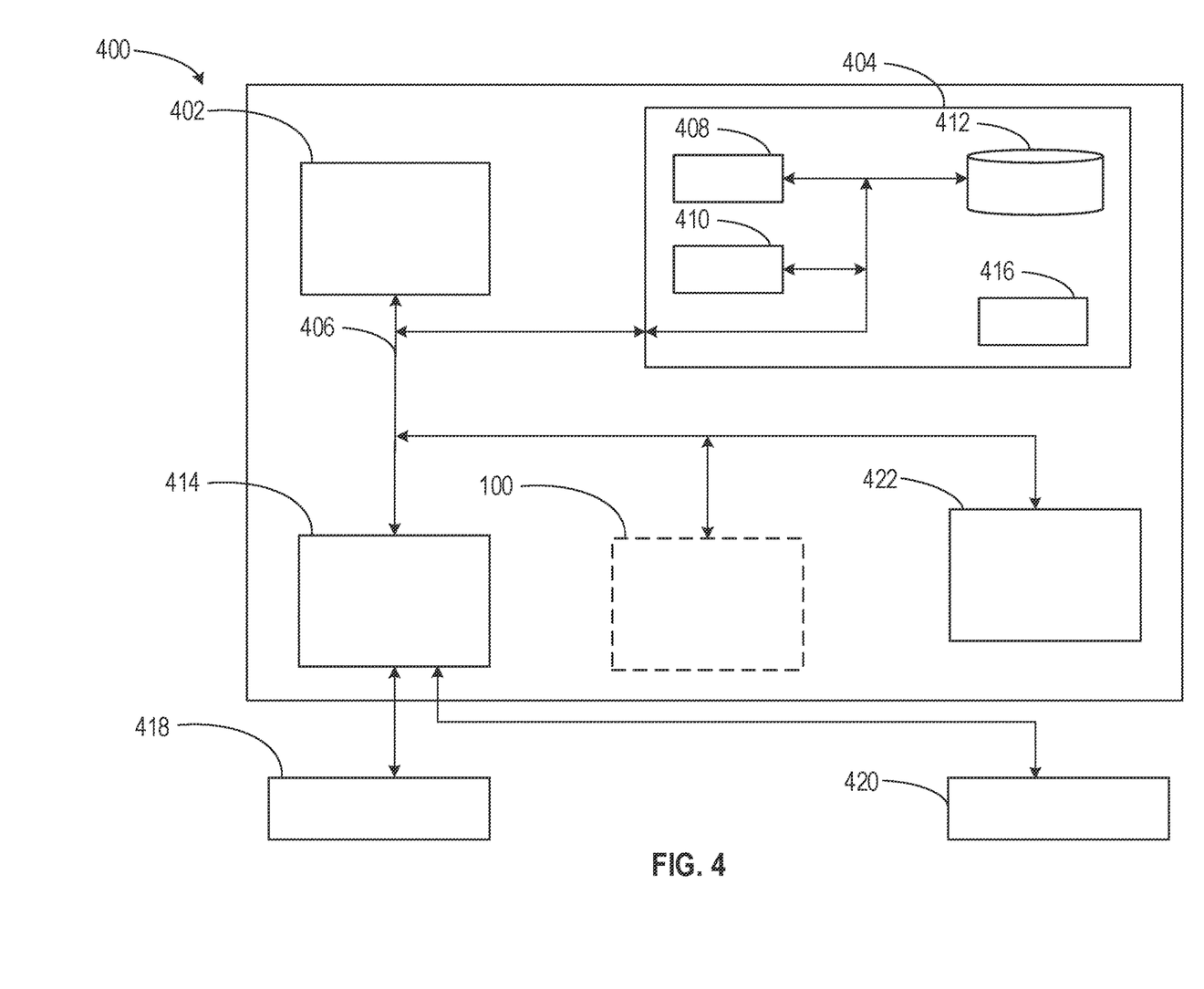
FIG. 4 depicts a block diagram of a computing system for error detection and correction of query expressions, according to at least one embodiment.

Embodiments of the present disclosure may be implemented together with virtually any type of computer, regardless of the platform is suitable for storing and/or executing program code. FIG. 4 shows, as an example, a computing system 400 (e.g., cloud computing system) suitable for executing program code related to the methods disclosed herein and for error detection and correction of query expressions.

The computing system 400 is only one example of a suitable computer system and is not intended to suggest any limitation as to the scope of use or functionality of embodiments of the present disclosure described herein, regardless, whether the computer system 400 is capable of being implemented and/or performing any of the functionality set forth hereinabove. In the computer system 400, there are components, which are operational with numerous other general purpose or special purpose computing system environments or configurations. Examples of well-known computing systems, environments, and/or configurations that may be suitable for use with computer system/server 400 include, but are not limited to, personal computer systems, server computer systems, thin clients, thick clients, handheld or laptop devices, multiprocessor systems, microprocessor-based systems, set-top boxes, programmable consumer electronics, network PCs, minicomputer systems, mainframe computer systems, and distributed cloud computing environments that include any of the above systems or devices, and the like. Computer system/server 400 may be described in the general context of computer system-executable instructions, such as program modules, being executed by a computer system 400. Generally, program modules may include routines, programs, objects, components, logic, data structures, and so on that perform particular tasks or implement particular abstract data types. Computer system/server 400 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 400 is shown in the form of a general-purpose computing device. The components of computer system/server 400 may include, but are not limited to, one or more processors 402 (e.g., processing units), a system memory 404 (e.g., a computer-readable storage medium coupled to the one or more processors), and a bus 406 that couple various system components including system memory 404 to the processor 402. Bus 406 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 400 typically includes a variety of computer system readable media. Such media may be any available media that is accessible by computer system/server 400, and it includes both, volatile and non-volatile media, removable and non-removable media.

The system memory 404 may include computer system readable media in the form of volatile memory, such as random-access memory (RAM) 408 and/or cache memory 410. Computer system/server 400 may further include other removable/non-removable, volatile/non-volatile computer system storage media. By way of example only, a storage system 412 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 406 by one or more data media interfaces. As will be further depicted and described below, the system memory 404 may include at least one program product having a set (e.g., at least one) of program modules that are configured to carry out the functions of embodiments of the present disclosure.

The program/utility, having a set (at least one) of program modules 416, may be stored in the system memory 404 by way of example, and not limiting, as well as an operating system, one or more application programs, other program modules, and program data. Program modules may include one or more of the query component 110, the set component 120, the comparison component 130, and the report component 140, which are illustrated in FIG. 1. Each of the operating systems, one or more application programs, other program modules, and program data or some combination thereof, may include an implementation of a networking environment. Program modules 416 generally carry out the functions and/or methodologies of embodiments of the present disclosure, as described herein.

The computer system/server 400 may also communicate with one or more external devices 418 such as a keyboard, a pointing device, a display 420, etc.; one or more devices that enable a user to interact with computer system/server 400; and/or any devices (e.g., network card, modem, etc.) that enable computer system/server 400 to communicate with one or more other computing devices. Such communication can occur via Input/Output (I/O) interfaces 414. Still yet, computer system/server 400 may communicate with one or more networks such as a local area network (LAN), a general wide area network (WAN), and/or a public network (e.g., the Internet) via network adapter 422. As depicted, network adapter 422 may communicate with the other components of computer system/server 400 via bus 406. It should be understood that, although not shown, other hardware and/or software components could be used in conjunction with computer system/server 400. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Service models may include software as a service (SaaS), platform as a service (PaaS), and infrastructure as a service (IaaS). In SaaS, the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings. In PaaS, the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. In IaaS, the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment models may include private cloud, community cloud, public cloud, and hybrid cloud. In private cloud, the cloud infrastructure is operated solely for an organization. It may be managed by the organization or a third party and may exist on-premises or off-premises. In community cloud, the cloud infrastructure is shared by several organizations and supports specific community that has shared concerns (e.g., mission, security requirements, policy, and compliance considerations). It may be managed by the organizations or a third party that may exist on-premises or off-premises. In public cloud, the cloud infrastructure is made available to the general public or a large industry group and is owned by an organization selling cloud services. In hybrid cloud, the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling modularity, and semantic interoperability. At the heart of cloud computing is an infrastructure that includes a network of interconnected nodes.

Figure 5:
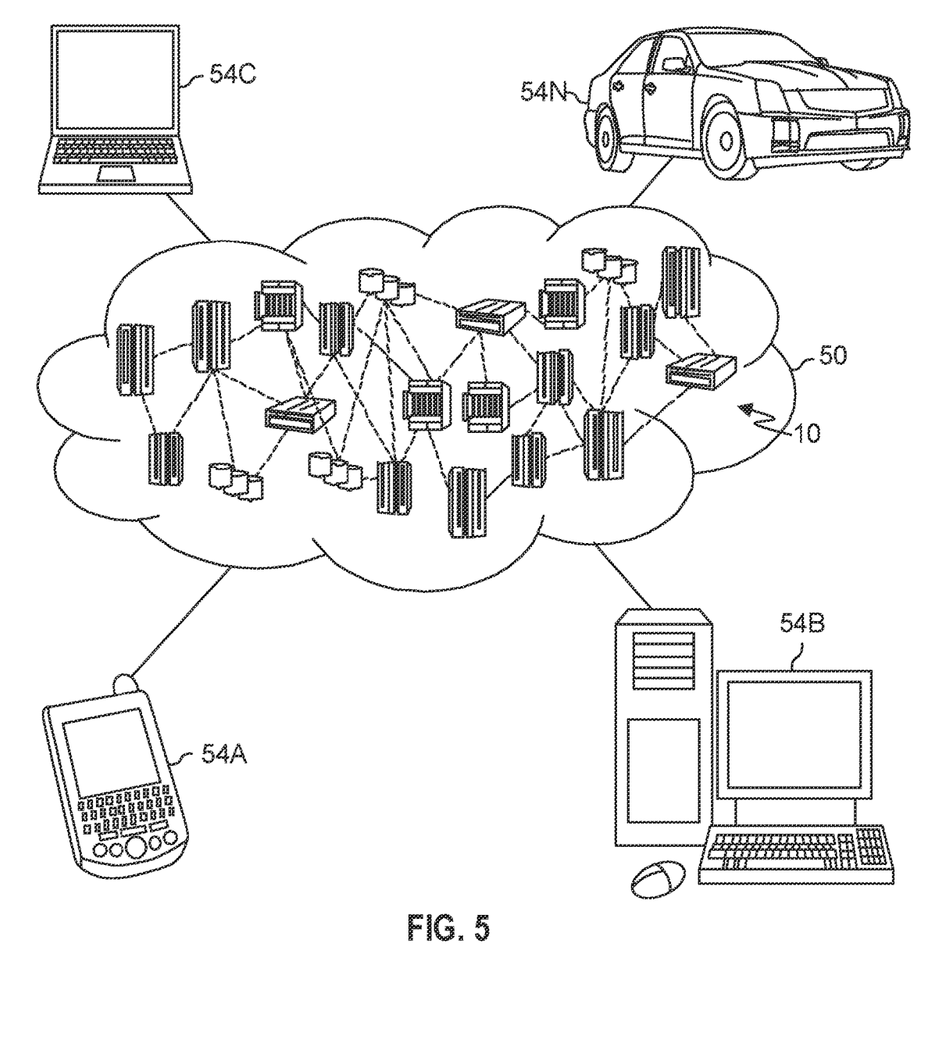
FIG. 5 is a schematic diagram of a cloud computing environment in which concepts of the present disclosure may be implemented, in accordance with an embodiment of the present disclosure.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
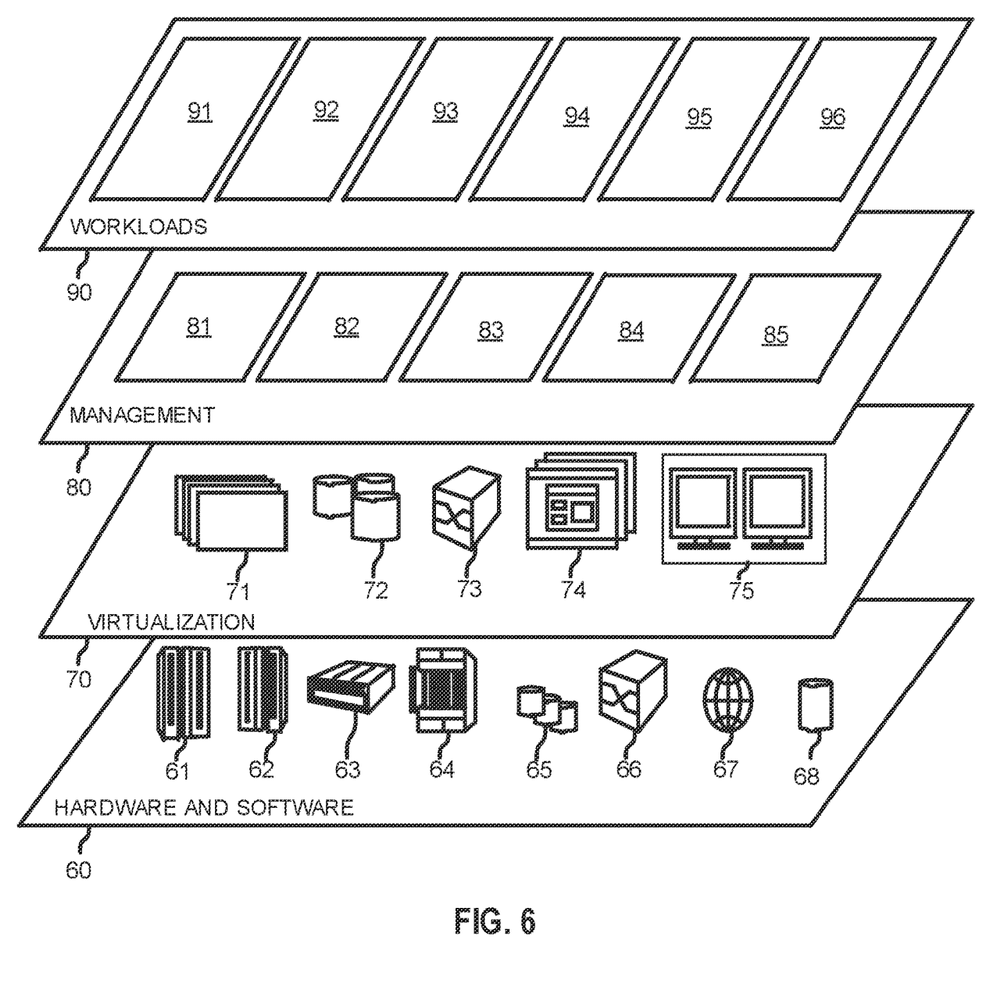
FIG. 6 is a diagram of model layers of a cloud computing environment in which concepts of the present disclosure may be implemented, in accordance with an embodiment of the present disclosure.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and error detection processing 96.

Cloud models may include characteristics including on-demand self-service, broad network access, resource pooling, rapid elasticity, and measured service. In on-demand self-service a cloud consumer may unilaterally provision computing capabilities such as server time and network storage, as needed automatically without requiring human interaction with the service's provider. In broad network access, capabilities are available over a network and accessed through standard mechanisms that promote use by heterogeneous thin or thick client platforms (e.g., mobile phones, laptops, and PDAs). In resource pooling, the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). In rapid elasticity, capabilities can be rapidly and elastically provisioned, in some cases automatically, to quickly scale out and rapidly released to quickly scale in. To the consumer, the capabilities available for provisioning often appear to be unlimited and can be purchased in any quantity at any time. In measured service, cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

The descriptions of the various embodiments of the present disclosure have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer-readable storage medium (or media) having computer readable program instructions thereon for causing a processor to carry out aspects of the present invention.

The computer-readable storage medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer-readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present disclosure has been presented for purposes of illustration and description, but is not intended to be exhaustive or limited to the present disclosure in the form disclosed. Many modifications and variations will be apparent to those of ordinary skills in the art without departing from the scope of the present disclosure. The embodiments are chosen and described in order to explain the principles of the present disclosure and the practical application, and to enable others of ordinary skills in the art to understand the present disclosure for various embodiments with various modifications, as are suited to the particular use contemplated.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   extracting, by a processor, a first set of queries from code of a set of programs prior to query editing;
   generating, by the processor, a first similarity coefficient for a first word pair in a first word set from the first set of queries;
   extracting, by the processor, a second set of queries from the code of the set of programs after the query editing;
   generating, by the processor, a second similarity coefficient for a second word pair in a second word set from the second set of queries;
   generating, by the processor, a set of differences for the first and second word pairs within the first word set and the second word set based on the first and second similarity coefficients;
   generating, by the processor, a third word set from one or more edited queries based on the set of differences for the first and second word pairs within the first word set and the second word set;

generating, by the processor, a word score for a word in the third word set, the word score representative of a difference for word pairs of the word in the third word set and other words in the third word set; and generating, by the processor, an error report for the third word set based on the third word set and the set of differences, the error report identifying the word from the one or more edited queries as a query correction candidate based on the word score.

2. The method of claim 1, wherein generating the first word set from the first set of queries further comprises:
   extracting words from each query of the first set of queries to form the first word set; and
   generating the first similarity coefficient for each word pair of the first word set.

3. The method of claim 2, wherein generating the second word set from the second set of queries further comprises:
   extracting words from each query of the second set of queries to form the second word set; and
   generating the second similarity coefficient for each word pair of the second word set.

4. The method of claim 3, wherein generating the set of differences for the first and second word pairs further comprises:
   generating a difference for each word pair in the first word set and the second word set.

5. The method of claim 4, wherein generating the third word set from the one or more edited queries based on the set of differences further comprises:
   generating a word score for each word in the third word set.

6. The method of claim 5, wherein generating the error report for the third word set further comprises:
   identifying a first word in the third word set with a highest word score as an error.

7. The method of claim 5, wherein generating the error report for the third word set further comprises:
   identifying a second word in the third word set with a lowest word score as an error correction candidate.

8. A system, comprising:
   one or more processors; and
   a computer-readable storage medium, coupled to the one or more processors, storing program instructions that, when executed by the one or more processors, cause the one or more processors to perform operations comprising:
      extracting a first set of queries from code of a set of programs prior to query editing;
      generating a first similarity coefficient for a first word pair in a first word set from the first set of queries;
      extracting a second set of queries from the code of the set of programs after the query editing;
      generating a second similarity coefficient for a second word pair in a second word set from the second set of queries;
      generating a set of differences for the first and second word pairs within the first word set and the second word set based on the first and second similarity coefficients;
      generating a third word set from one or more edited queries based on the set of differences for the first and second word pairs within the first word set and the second word set;
      generating a word score for a word in the third word set, the word score representative of a difference for word pairs of the word in the third word set and other words in the third word set; and
      generating an error report for the third word set based on the third word set and the set of differences, the error report identifying the word from the one or more edited queries as a query correction candidate based on the word score.

9. The system of claim 8, wherein generating the first word set from the first set of queries further comprises:
   extracting words from each query of the first set of queries to form the first word set; and
   generating the first similarity coefficient for each word pair of the first word set.

10. The system of claim 9, wherein generating the second word set from the second set of queries further comprises:
    extracting words from each query of the second set of queries to form the second word set; and
    generating the second similarity coefficient for each word pair of the second word set.

11. The system of claim 10, wherein generating the set of differences for the first and second word pairs further comprises:
    generating a difference for each word pair in the first word set and the second word set.

12. The system of claim 11, wherein generating the third word set from the one or more edited queries based on the set of differences further comprises:
    generating a word score for each word in the third word set.

13. The system of claim 12, wherein generating the error report for the third word set further comprises:
    identifying a first word in the third word set with a highest word score as an error.

14. The system of claim 12, wherein generating the error report for the third word set further comprises:
    identifying a second word in the third word set with a lowest word score as an error correction candidate.

15. A computer program product comprising a computer readable storage medium having program instructions embodied therewith, the program instructions being executable by one or more processors to cause the one or more processors to perform operations comprising:
    extracting a first set of queries from code of a set of programs prior to query editing;
    generating a first similarity coefficient for a first word pair in a first word set from the first set of queries;
    extracting a second set of queries from the code of the set of programs after the query editing;
    generating a second similarity coefficient for a second word pair in a second word set from the second set of queries;
    generating a set of differences for the first and second word pairs within the first word set and the second word set based on the first and second similarity coefficients;
    generating a third word set from one or more edited queries based on the set of differences for the first and second word pairs within the first word set and the second word set;
    generating a word score for a word in the third word set, the word score representative of a difference for word pairs of the word in the third word set and other words in the third word set; and
    generating an error report for the third word set based on the third word set and the set of differences, the error report identifying the word from the one or more edited queries as a query correction candidate.

16. The computer program product of claim 15, wherein generating the first word set from the first set of queries further comprises:

extracting words from each query of the first set of queries to form the first word set; and generating the first similarity coefficient for each word pair of the first word set.

17. The computer program product of claim 16, wherein generating the second word set from the second set of queries further comprises:

extracting words from each query of the second set of queries to form the second word set; and generating the second similarity coefficient for each word pair of the second word set.

18. The computer program product of claim 17, wherein determining generating the set of differences for the first and second word pairs further comprises:

generating a difference for each word pair in the first word set and the second word set.

19. The computer program product of claim 18, wherein generating the third word set from the one or more edited queries based on the set of differences further comprises:

generating a word score for each word in the third word set.

20. The computer program product of claim 19, wherein generating the error report for the third word set further comprises:

identifying a first word in the third word set with a highest word score as an error; and identifying a second word in the third word set with a lowest word score as an error correction candidate.

\* \* \* \* \*